March 8, 1955 R. J. BERGEMANN ET AL 2,703,881
SIMULATED SIGNAL SOURCE
Filed Dec. 10, 1945 2 Sheets-Sheet 1

INVENTOR.
ROBERT J. BERGEMANN
EDMUND R. BRILL
BY
*William D. Hall.*
ATTORNEY

March 8, 1955  R. J. BERGEMANN ET AL  2,703,881
SIMULATED SIGNAL SOURCE
Filed Dec. 10, 1945  2 Sheets-Sheet 2

INVENTORS.
ROBERT J. BERGEMANN
EDMUND R. BRILL
BY
William D. Hall
ATTORNEY

United States Patent Office 2,703,881
Patented Mar. 8, 1955

2,703,881

SIMULATED SIGNAL SOURCE

Robert J. Bergemann, New York, N. Y., and Edmund R. Brill, Cambridge, Mass., assignors to the United States of America as represented by the Secretary of War Application December 10, 1945, Serial No. 634,104

5 Claims. (Cl. 343—18)

This invention relates generally to electrical apparatus and more specifically to a radio transmitter.

In one method of electronically locating the position of distant objects a pulse of radio frequency energy is transmitted, which, upon striking said distant object, produces an "echo" of radio frequency energy which is returned to the transmitting location. Upon suitable detection of this echo signal and application thereof to an indicating device, it is possible to determine the relative locations of distant objects.

As is familiar to those skilled in the art, there are instances when it is desirable to produce an effect upon a radio object-locating device indicator to prevent the operator of said locating device from determining the correct position of an object. One method of producing "confusion" indications on the indicator is to scatter foil or metal strips in the air. These dispersed materials reflect the radio frequency energy from the object-locating device and produce an effect on the indicator similar to that produced by a multiple number of approaching aircraft. If the scatterers are distributed properly, the locating device operator will be confused in attempting to determine the size, quantity or type of object the locating device is indicating.

It is an object of this invention to provide a novel means of confusing a radio object-locating device operator as to the type of object the device has located.

It is further an object of this invention to produce an effect upon the indicator of a radio object-locating device similar to that caused by random scatterers of foil or metal strips dispersed in the air.

It is further an object of this invention to provide a novel means of producing an "echo" effect upon a radio object-locating device indicator which will cause operator to believe that objects are ahead or closer than they actually are, thereby preventing the radio object locating device operator from determining the position of the transmitter bearing craft.

Other objects, features and advantages of this invention will suggest themselves to those skilled in the art and will become apparent from the following description of the invention taken in connection with the accompanying drawing, in which.

Figure 1:
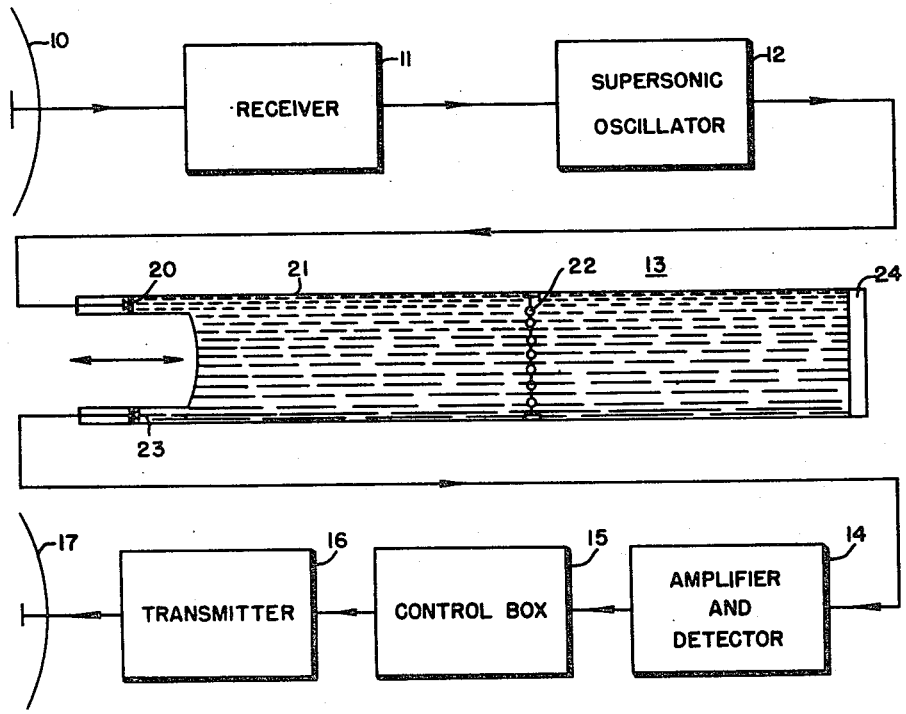
Fig. 1 is a block diagram illustrating the principles of this invention.

Referring now more particularly to Fig. 1, antenna 10 is electrically connected to receiver 11. The output of receiver 11 is applied to oscillator 12. The output of oscillator 12 is applied to a supersonic delay line modulation generator 13. The output of modulation generator 13 is applied to amplifier and detector 14. The output of the amplifier and detector 14 is applied to control box 15 and thence to transmitter 16, the output of transmitter 16 being applied to transmitting antenna 17. It is to be understood that antenna 10 and antenna 17 could actually be the same antenna.

In operation, antenna 10 receives pulses of radio frequency energy from a radio object-locating device, which it passes to receiver 11 where said pulses are detected to produce video signals of approximately the same duration and interval as the received pulses. The video signals from the receiver 11 trigger the oscillator 12 which produces electrical supersonic oscillations. The oscillations from oscillator 12 are applied to modulation generator 13 by means of crystal 20. Modulation generator 13 consists of a hollow container 21 containing a liquid of a nature consistent with the desired transmitting frequency as well as the type of random scatterer used. Within conductor 21 is mounted a random scatterer 22. Scatterer 22 reflects energy in a random pattern. One end of container 21 contains a layer of material 24 that will absorb the energy that reaches it, thereby preventing reflections of a repetitive pattern.

Figure 2:
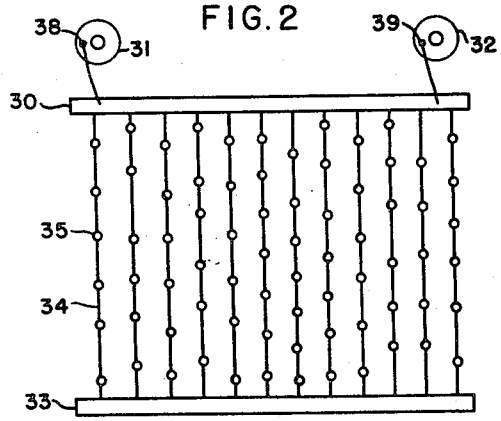
Fig. 2 illustrates one means of mechanically producing random modulation.

Referring now more particularly to Fig. 2 which illustrates means for producing random echoes of energy, frame 30 is mechanically connected to rotating cranks 31 and 32. Frame 33 is fixed in position. Between frames 30 and 33 extremely fine wires 34 are secured. Reflecting objects 35 are mounted on wires 34 in a random fashion. Frame 30 has a certain amount of movement governed by two actuating shafts 38 and 39 eccentirically mounted on cranks 31 and 32 respectively. Thus, as the actuated frame 30 is moved away from or towards the fixed frame 33 the wires are alternately tightened and loosened, causing the attached reflecting objects to constantly change position. The rate of translational motion of the reflectors can be controlled depending upon the frequency to be transmitted so that the average rate at which the signal fluctuates is that which is characteristic for the frequency used. The dimensions of conductor 21, Fig. 1, will depend upon the desired transmitting frequency. An adjustment to compensate for different pulse repetition frequencies of the radio object-locating device is provided by making the distance between crystal 20 and crystal 23 adjustable.

Figure 3:
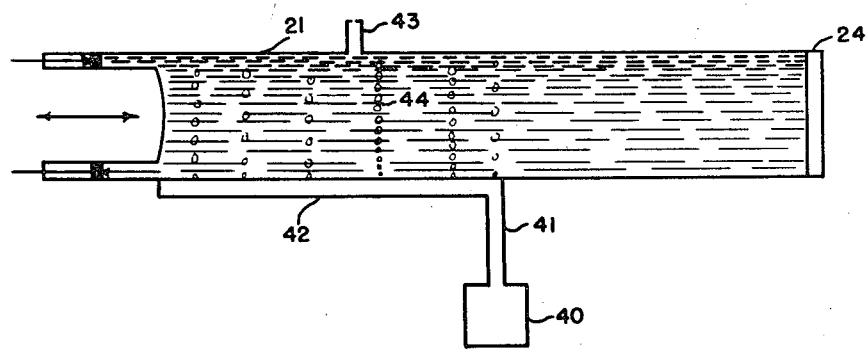
Fig. 3 illustrates a second means of producing random modulation.

Referring now more particularly to Fig. 3 which illustrates a second means for producing random echoes of energy, a portion of container 21 is constructed of a porous material which will admit small amounts of air well diffused. Air pressure means 40 is connected by tube 41 to container 42. A vent 43 is supplied to enable air to escape from container 21. The stream of air bubbles 44 flows through the liquid within container 21 in a random fashion, that is, the bubbles do not occur in any predictable pattern. The air bubbles in the liquid act similarly to reflecting objects, that is, when energy strikes them, some of the energy is reflected in the direction of the sending source.

The random signals produced in modulation generator 22 are modulation signals having a carrier whose frequency is that of the supersonic oscillations impressed upon crystal 20, and these signals and their carrier are removed from generator 13 by means of crystal 23 and are applied to the amplifier and detector 14 where they are amplified and detected. The output of amplifier and detector 14 is applied to control box 15 which determines the duration of the signals to be transmitted, the output of control box 15 being applied to transmitter 16. Transmitter 16 operates on the same frequency as the radio object-locating device, that is, the same frequency as the radio frequency energy received by antenna 10. The energy from transmitter 16 is radiated by means of antenna 17.

The energy from transmitter 16 produces a signal several times the original time duration of the received pulse and which fluctuates in magnitude at a random rate. This signal can be used to simulate paper or foil type random scatterers and to cover up the echo or reflection of the craft bearing the transmitter as well as other craft in the vicinity.

This invention may also be adapted to serve as a laboratory signal generator to produce random signals for experimental purposes and may be used to simulate the effect of foil strips dispersed in the air for the purpose of training radio object-locating device operators.

While there has been described what is at present considered to be the preferred embodiment of this invention, it will be obvious to those skilled in the art that various changes and modifications may be made therein without departing from the scope of the invention.

The invention claimed is:

1. In a system for providing simulated radio object locator reflections, a supersonic delay line modulation generator comprising, a liquid delay line, means for applying supersonic energy to said delay line, means for causing the energy in said delay line to vary in a random manner, and means for deriving a signal from the energy varying in a random manner within said delay line.

2. The generator of claim 1, wherein said applying and deriving means comprise a pair of crystals, said crystals being movable relative to one another.

3. The generator of claim 2, wherein said crystals are disposed at one end of said delay line, and further including energy absorption means disposed at the other end of said delay line.

4. The generator of claim 1, wherein said means for causing the delay line energy to vary in a random manner comprises a frame to which a plurality of energy reflecting objects are attached and supported, and means for deforming said frame.

5. The generator of claim 1, wherein said means for causing the delay line energy to vary in a random manner comprises a source of a gaseous medium, and means for passing said gaseous medium through said liquid delay line in small amounts.

References Cited in the file of this patent

UNITED STATES PATENTS

| | | |
|---|---|---|
| 2,207,620 | Hilferty | July 9, 1940 |
| 2,212,110 | Beuermann | Aug. 20, 1940 |
| 2,407,294 | Schockley et al. | Sept. 10, 1946 |
| 2,416,307 | Grieg | Feb. 25, 1947 |
| 2,440,253 | Dodington | Apr. 27, 1948 |
| 2,477,485 | Jacob | July 26, 1949 |
| 2,557,979 | Labin | Jan. 26, 1951 |
| 2,581,780 | Ahier | Jan. 8, 1952 |